US009279043B2

(12) United States Patent
Wilson

(10) Patent No.: US 9,279,043 B2
(45) Date of Patent: Mar. 8, 2016

(54) SELF-HEALING AGENT FORMULATIONS CONTAINING LIQUID CORROSION INHIBITORS

(71) Applicant: Autonomic Materials, Inc., Champaign, IL (US)

(72) Inventor: Gerald O. Wilson, Champaign, IL (US)

(73) Assignee: Autonomic Materials, Inc., Champaign, IL (US)

( * ) Notice: Subject to any disclaimer, the term of this patent is extended or adjusted under 35 U.S.C. 154(b) by 0 days.

(21) Appl. No.: 14/521,562

(22) Filed: Oct. 23, 2014

(65) Prior Publication Data

US 2015/0111987 A1   Apr. 23, 2015

Related U.S. Application Data

(60) Provisional application No. 61/894,696, filed on Oct. 23, 2013.

(51) Int. Cl.
   C08K 9/10      (2006.01)
   C09D 5/08      (2006.01)
   B29C 73/22     (2006.01)
   C09D 7/12      (2006.01)

(52) U.S. Cl.
   CPC . C08K 9/10 (2013.01); B29C 73/22 (2013.01); C09D 5/08 (2013.01); C09D 7/125 (2013.01); C09D 7/1241 (2013.01); C09D 7/1291 (2013.01)

(58) Field of Classification Search
   CPC ............. C08K 9/10; C09D 5/08; B29C 73/22
   See application file for complete search history.

(56) References Cited

U.S. PATENT DOCUMENTS

| 6,075,072 A * | 6/2000 | Guilbert et al. ............... 523/200 |
| 7,723,405 B2 | 5/2010 | Braun et al. |
| 7,790,225 B1 | 9/2010 | Calle et al. |
| 2002/0081431 A1* | 6/2002 | Schmdt ........................ 428/402 |
| 2004/0071887 A1* | 4/2004 | Newton ........................ 427/386 |
| 2005/0059835 A1* | 3/2005 | Wassmann-Wilken et al. ............................. 556/437 |
| 2008/0152815 A1 | 6/2008 | Stephenson et al. |
| 2012/0207921 A1 | 8/2012 | Calle et al. |
| 2013/0145957 A1* | 6/2013 | Shchukin et al. .......... 106/14.05 |
| 2014/0272364 A1* | 9/2014 | Fitz et al. ..................... 428/220 |

FOREIGN PATENT DOCUMENTS

WO          2013009873 A2      1/2013

* cited by examiner

*Primary Examiner* — Vickey Nerangis
(74) *Attorney, Agent, or Firm* — Schwabe Williamson & Wyatt

(57) ABSTRACT

Disclosed herein are self-healing systems that include corrosion inhibitors and self-healing materials that are capable of repairing themselves without any external intervention when they are damaged. The self-healing materials and corrosion inhibitors may be microencapsulated, and damage to a matrix containing the microcapsules may rupture the microcapsules and cause the self-healing materials and corrosion inhibitors to be released into the site of damage. The self-healing materials then may polymerize and restore the functional capabilities of the matrix, and the corrosion inhibitors may work in concert with the self healing materials to prevent corrosion at the site of damage.

14 Claims, 10 Drawing Sheets

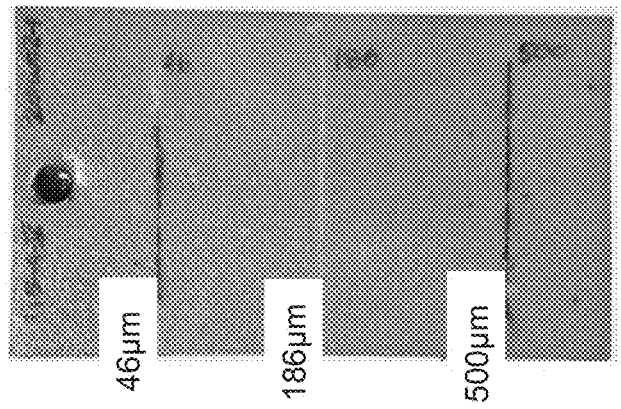
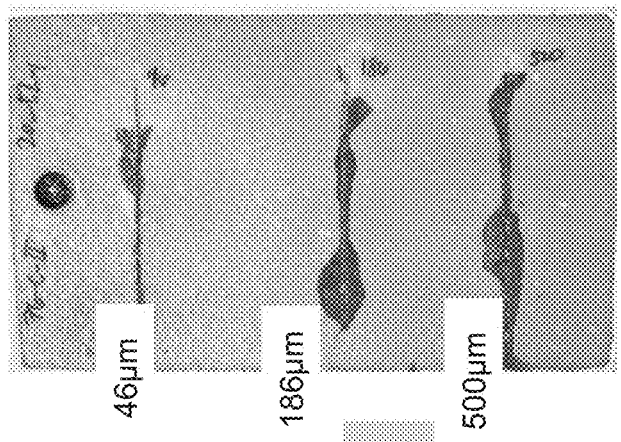
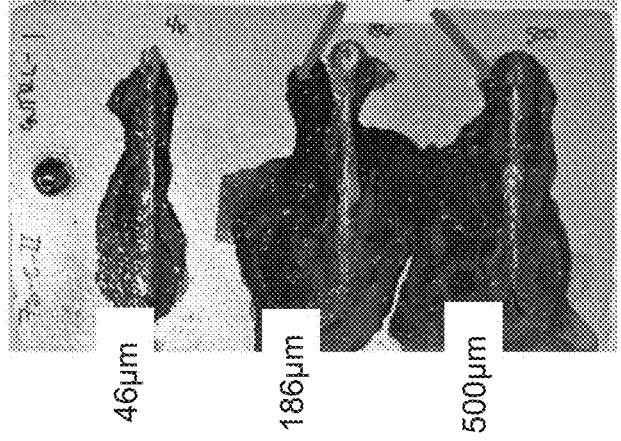

SELF-HEALING AGENT FORMULATIONS CONTAINING LIQUID CORROSION INHIBITORS

CROSS REFERENCE TO RELATED APPLICATION

The present application claims priority to U.S. Provisional Patent Application No. 61/894,696, filed Oct. 23, 2013, entitled "SELF-HEALING AGENT FORMULATIONS CONTAINING LIQUID CORROSION INHIBITORS," the entire disclosure of which is hereby incorporated by reference in its entirety.

TECHNICAL FIELD

Embodiments herein relate to self-healing materials, particularly self-healing formulations that contain corrosion inhibitors.

BACKGROUND

The failure of coatings, adhesives and sealants used for the protection and/or adjoining of metal substrates is a costly problem. The costs associated with such failure typically stem from repair costs (materials and labor) and costs due to corrosion damage to assets (lost productivity and asset replacement). Thus, the failure of coatings, polymerized resins, adhesives, sealants, and composites may necessitate costly repairs and the sidelining of parts, equipment, or facilities comprised of these materials. In addition to the costly maintenance associated with the failure of materials, the minimization of environmental impact benefits from the use of longer-lasting materials. Generally, materials that can repair themselves when they are damaged last longer in their specific applications.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 2A), a polyurethane coating containing 20 percent by weight (wt %) Series 1 microcapsules (FIG. 2B), and a polyurethane coating containing 20 wt % Series 1 microcapsules, which in turn contain 3 wt % Corrosion Inhibitor 1 (CI-1; FIG. 2C), in accordance with various embodiments;

FIG. 5A), an epoxy coating containing 5 wt % Series 2 microcapsules (FIG. 5B), and an epoxy coating containing 5 wt % Series 2 microcapsules, which in turn contain 5 wt % CI-1 (FIG. 5C), in accordance with various embodiments;

FIG. 8A), an epoxy coating containing 5 wt % Series 3 microcapsules (FIG. 8B), and an epoxy coating containing 5 wt % Series 3 microcapsules, which in turn contain 5 wt % CI-1 (FIG. 8C), in accordance with various embodiments;

FIGS. 10A, 10B and 10C are digital images of various polyurethane formulations applied on cold-rolled steel substrates after exposure to ASTM B117 conditions for 240 hours, in which the area of substrate corrosion creep is labeled for a control sample (standard polyurethane coating; FIG. 10A), a polyurethane coating containing 5 wt % Series 3 microcapsules (FIG. 10B), and a polyurethane coating containing 5 wt % Series 3 microcapsules, which in turn contain 5 wt % Corrosion Inhibitor 2 (CI-2; FIG. 10C), in accordance with various embodiments.

DETAILED DESCRIPTION OF EMBODIMENTS OF THE INVENTION

Figure 1:
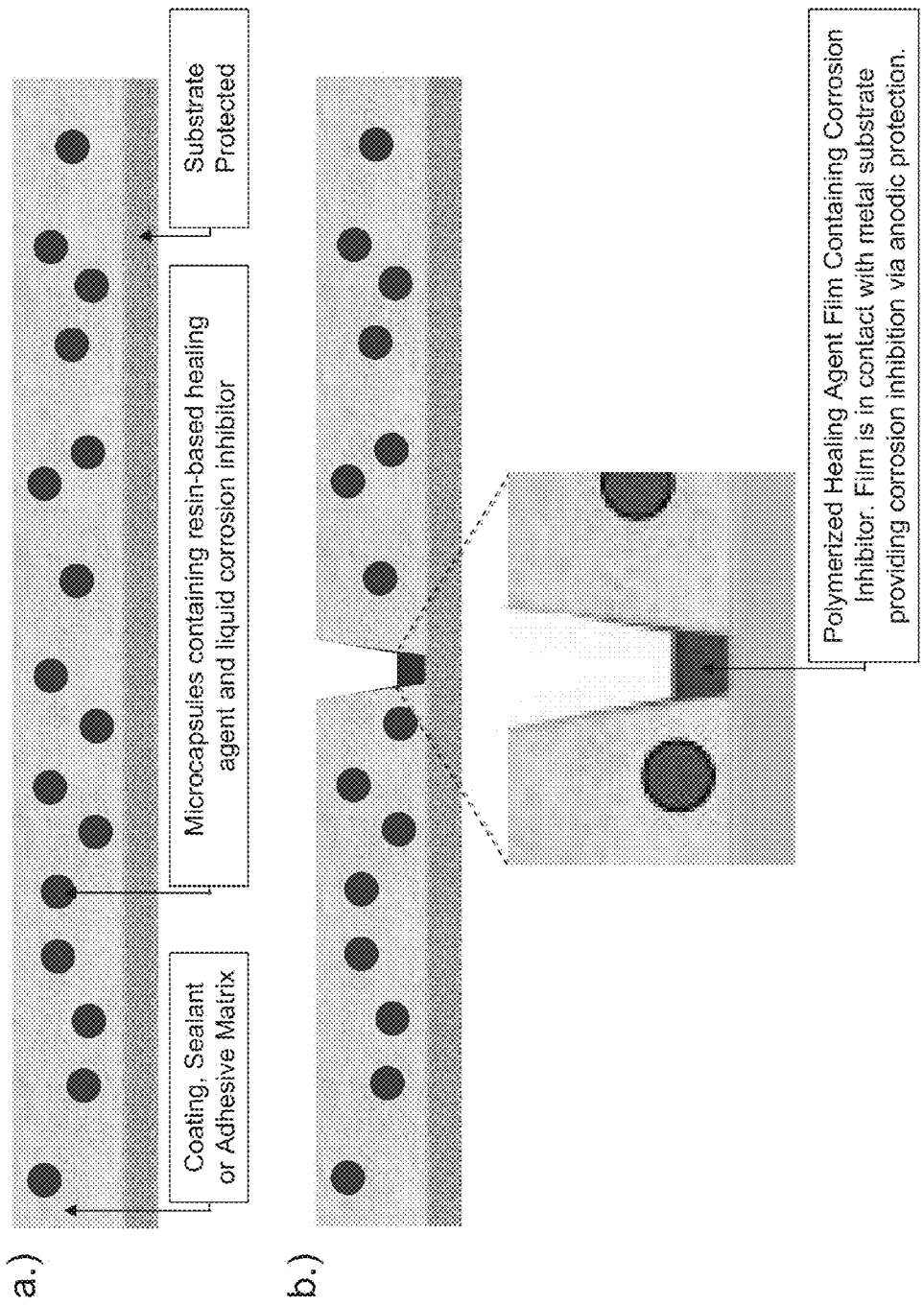
FIGS. 1A and 1B illustrate schematic diagrams of a self-healing material, including a self-healing coating, sealant, reinforced polymer composite, or adhesive matrix incorporating a microencapsulated healing agent containing a liquid corrosion inhibitor (FIG. 1A), and the same self-healing coating, sealant, reinforced polymer composite, or adhesive matrix during a healing event (FIG. 1B), in which the healing agent polymerizes to form a thin film containing a corrosion inhibitor, in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Disclosed herein in various embodiments are self-healing systems, which term refers to systems that include self-healing agents that are capable of repairing themselves without any external intervention when they are damaged. In various embodiments, the self-healing agents may be microencapsulated, and damage to a matrix containing the microcapsules may rupture the microcapsules and cause the self-healing agent to be released into the site of damage, where it may polymerize and restore the functional capabilities of the matrix. As used herein, the term "matrix" refers to any material that includes a plurality of microcapsules. In various embodiments disclosed herein, such microcapsules also may contain a liquid corrosion inhibitor that performs in concert with the polymerized healing agent to protect the substrate after a healing event has taken place. In various embodiments, the resulting polymerized healing agent may provide corrosion resistance through the restoration of a new barrier that is fortified with a corrosion inhibitor.

In various embodiments, the self-healing agent may form a protective layer bonded to a metal substrate, and the corrosion inhibitor may prevent corrosion of the metal substrate after a healing event. FIGS. 1A and 1B illustrate schematic diagrams of a self-healing system, including a self-healing coating, sealant, reinforced polymer composite, adhesive, or matrix incorporating a microencapsulated self-healing agent and a liquid corrosion inhibitor (FIG. 1A), and the same self-healing coating, sealant, reinforced polymer composite, adhesive, or matrix during a healing event (FIG. 1B), in which the healing agent polymerizes to form a thin film containing a corrosion inhibitor, in accordance with various embodiments. In various embodiments, such microcapsules may be incorporated into coatings, sealants, reinforced polymer composites, adhesives, and other matrices used with metal substrates. Although the self-healing agent is illustrated in FIG. 1 as being combined with the corrosion inhibitor in the same microcapsules, one of skill in the art will appreciate that in other embodiments, the self-healing agent and the corrosion inhibitor may be separately encapsulated in different microcapsules, or the self-healing agent may be encapsulated in the microcapsules while the corrosion inhibitor may be bound to the exterior surface of the microcapsules.

In various embodiments, when such a matrix is damaged, the self-healing agent, fortified with a corrosion inhibitor, may be released into the site of damage. Once released, the self-healing agent may polymerize and restore the adhesion of matrix material at the site of damage and enhance its protective capability, thereby preventing propagation of corrosion from the damaged site. Thus, in various embodiments, the polymerized self-healing agent may protect the substrate through both the barrier properties of the polymerized healing agent and the anodic protection offered by the corrosion inhibitor (see, e.g., FIG. 1B).

In various embodiments, various types of self-healing agents may be used as components of the self-healing systems described herein. For example, the disclosed self-healing systems may be a polydimethylsiloxane (PDMS)-based self-healing system (also referred to herein as "Series 1"), an epoxy-based self-healing system (also referred to herein as "Series 2"), or a silicone epoxy functionalized alkyd-based self-healing system (also referred to herein as "Series 3.") These self-healing systems are described more fully in U.S. Patent Application No. 61/834,733, Ser. No. 14/303,494, 61/845,499, and Ser. No. 14/329,740, the specifications of which are incorporated by reference in their entireties.

In various embodiments, the corrosion inhibitors of use in the disclosed self-healing systems may have the ability to combine in a homogeneous self-healing agent blend. For instance, such corrosion inhibitors may be completely miscible with a broad range of liquid self-healing agent formulations. In addition, such corrosion inhibitors may also exhibit characteristics that render them suitable for encapsulation and dispersion into a coating, reinforced polymer composite, adhesive, sealant, or other matrix in the encapsulated form.

Thus, in various embodiments, a corrosion inhibitor for use in the disclosed self-healing systems generally must be a liquid for facile incorporation into liquid healing agent formulations and to ensure release as part of the formulation. The corrosion inhibitor also generally must be insoluble in water, for instance for compatibility with a microencapsulation process dependent on the formation of an oil-in-water emulsion.

In various embodiments, a corrosion inhibitor for use in the disclosed self-healing systems also generally must be miscible with a broad range of healing agent formulations to form a single hydrophobic phase that can be encapsulated. Such corrosion inhibitors also generally must have a pH of between 4 and 8, for example, to prevent a challenge to the microencapsulation reaction mixture's ability to maintain the pH range critical for successful shell wall formation, in accordance with various embodiments. Additionally, as part of the healing agent formulation, in various embodiments, the corrosion inhibitor may promote adhesion to metal substrates including iron, aluminum and steel substrates.

A category of liquid corrosion inhibitors that meet these characteristics and that may be used in a range of healing agent formulations is the hybrid (organic-inorganic) sol-gel silicone ester-based liquid corrosion inhibitors. In various embodiments, these inhibitors may form an adhesion-promoting and corrosion-inhibiting sol-gel film on the surface of the substrate. Coupling to the metal surface begins with hydrolysis of the silicone ester to form a silanol, which couples with hydroxyl-rich surfaces of the metal substrate via condensation reactions, in accordance with various embodiments. In some embodiments, further moisture-promoted condensation of adjacent silicone ester groups may lead to the formation of a dense three-dimensional film across the metal substrate.

In various embodiments, the formation of this network may impart improved corrosion resistance to the substrate by impeding the transportation of ions through the network. Thus, when released as part of a self-healing formulation, the corrosion inhibitor may form a layer closest to the substrate that is well adhered to the surface, as well as the rest of the polymerized healing agent. In various embodiments, the hydrophobicity afforded by the silicone functionality may facilitate repulsion of moisture and protection from corrosion upon release into the site of damage during a healing event.

A representative structure of the silicone esters used in the preparation of these inhibitors is shown in scheme 1, below:

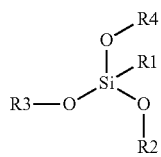

Groups labeled "R1," "R2," "R3," and "R4," may each independently be methyl, ethyl, or a higher molecular weight aliphatic group, such as propyl and butyl groups. However, in various embodiments, the effectiveness of the inhibitor may depend on the rate of the hydrolysis reaction, which may be impacted by steric bulk around the silicon atom, as well as the evaporation rate of the alcohol byproduct. As such, silicone esters where "R" is a methyl or ethyl group may yield particularly effective inhibitors. In various embodiments, the corrosion inhibitor molecule may be tethered to an oligomer or polymer chain or to a solid support prior to encapsulation. In other embodiments, the corrosion inhibitor may be tethered to the microcapsule shell wall via R1, R2, R3, or R4.

A second category of corrosion inhibitors that meet these characteristics and that may be used in a wide range of healing agent formulations are hydrophobic liquid corrosion inhibitors containing derivatives of benzothiazolylthio succinic acid. The common structural moiety for these inhibitors is shown in scheme 2 below.

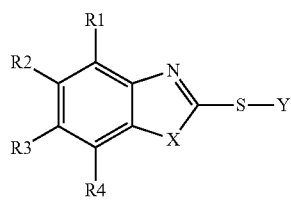

In various embodiments, the common structural moiety, X, is oxygen, sulfur, or a secondary or tertiary amine group, and R1, R2, R3, and R" are each independently hydrogen, alkyl, halogenoalkyl, alkoxy, alkyl thio, alkyl sulfonyl, cyclo alkyl phenyl, alkyl phenyl, phenyl alkyl, halogen, —CN, —NO$_2$, —COOH, —COOalkyl, —OH, a primary, secondary or tertiary amino, or carbamoyl group. Additionally, functional groups labeled as "Y" in scheme 2 constitute the rest of the corrosion inhibitor's chemical structure, and in various embodiments may include an aliphatic or cycloaliphatic mono-, di-, tri- or tetracarboxylic acid. In various embodiments, the corrosion inhibitor may be tethered to an oligomer or polymer or solid support through any part of the functional groups labeled R, X, or Y in the structural moiety depicted in scheme 2. In other embodiments, the corrosion inhibitor may be tethered to the microcapsule shell wall via R1, R2, R3, R4, Y, or X if X is a tertiary amine.

In the polymerized form, the corrosion inhibitor may remain incorporated within the polymerized healing agent, facilitating adhesion to the substrates. Additionally, in various embodiments, a primary mode of corrosion inhibition compatible with the healing agent delivery mechanism and liquid healing agents is anodic passivation via adsorption to the metal surface or covalent linkages elements in the metal substrate. In various embodiments, corrosion inhibitors may be added to a liquid healing agent formulation at concentrations ranging from 0.1 wt % to 10 wt %, and a combination of both classes of inhibitors may be used to leverage slightly different properties.

EXAMPLES

To demonstrate the improvement in corrosion resistance afforded by the incorporation of corrosion inhibitors in self-healing formulations, the following experiments were performed in which the corrosion resistance of self-healing materials containing a corrosion inhibitor was compared to similar formulations that did not include the corrosion inhibitor.

Example 1

Figure 2:
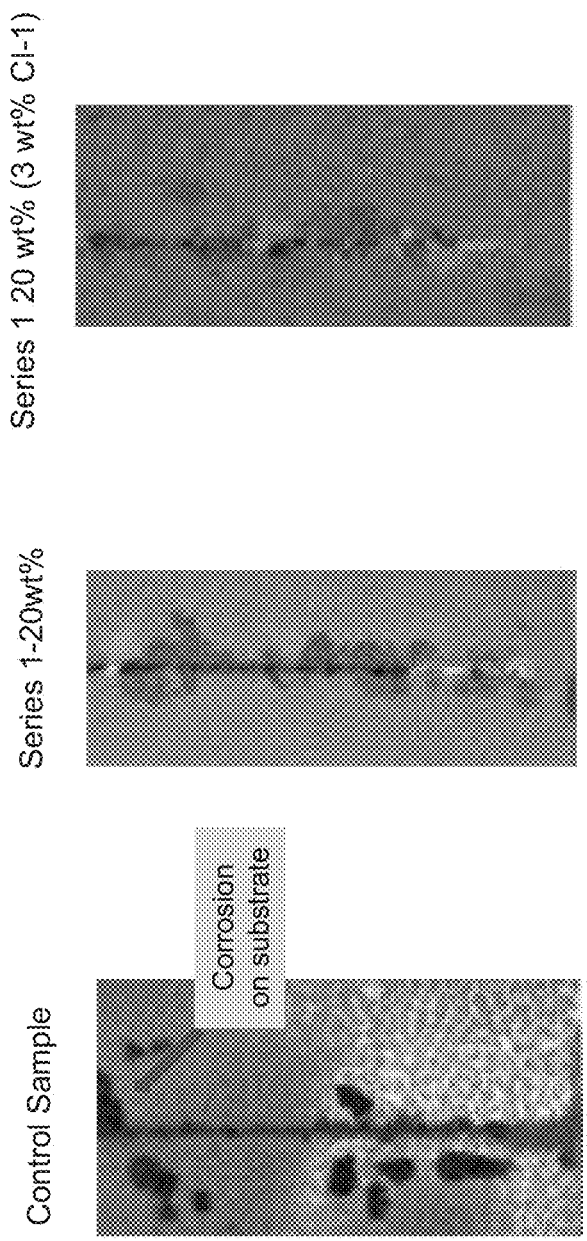
FIGS. 2A, 2B, and 2C illustrate three images of various polyurethane formulations applied on cold-rolled steel substrates after exposure to ASTM B117 conditions for 240 hours, including a control sample (standard polyurethane clear coating.

Silicone Ester-Based Corrosion Inhibitors in a Polydimethylsiloxane (PDMS)-Based Self-Healing System The results of the comparison of polydimethylsiloxane (PDMS)-based self-healing system (Series 1) with and without a silicone ester-based corrosion inhibitor (CI-1) are summarized in FIGS. 2A, 2B, and 2C, which illustrate three images of various polyurethane formulations applied on cold-rolled steel substrates after exposure to ASTM B117 conditions for 240 hours. These include a control sample (standard polyurethane clear coating; FIG. 2A), a polyurethane coating containing 20 percent by weight (wt %) Series 1 microcapsules (FIG. 2B), and a polyurethane coating containing 20 wt % Series 1 microcapsules, which in turn contain 3 wt % Corrosion Inhibitor 1 (CI-1; FIG. 2C).

Figure 3:
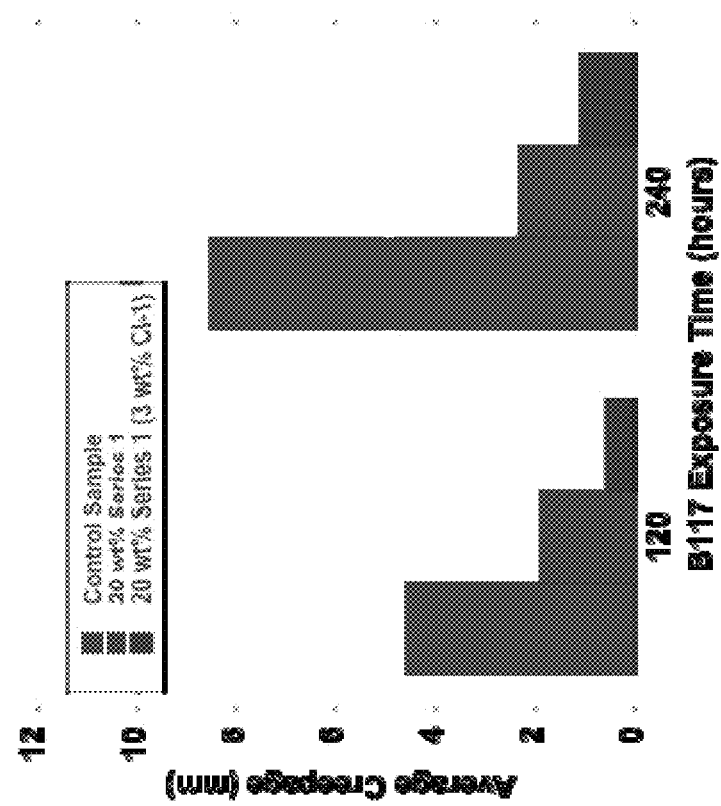
FIG. 3 is a graph showing a summary of the corrosion resistance of various polyurethane formulations applied on cold-rolled steel and exposed to ASTM B117 conditions for 240 hours, in accordance with various embodiments.

Microcapsules that were between 35 and 40 microns in average diameter (for capsules including and excluding CI-1) were added to a polyurethane clear coat (Desmophen A870/Desmodur 3390), and the resulting formulation was applied to lightly abraded cold-rolled steel substrates (CRS) to achieve a dry film thickness (DFT) of 400 microns. For samples incorporating microcapsules containing the corrosion inhibitor, the inhibitor was included at 3 wt %. The samples were scribed using a 500 micron scribe tool, and were exposed to ASTM B117 conditions for 240 hours. The corrosion creep, which was observed in the form of dark oxides visible away from the initial scribe (see, e.g., FIGS. 2A, 2B, and 2C), was evaluated and measured in mm. FIG. 3 shows a summary of the corrosion resistance of various polyurethane formulations applied on cold-rolled steel and exposed to ASTM B117 conditions for 240 hours. While the samples containing Series 1 with no corrosion inhibitor exhibited significant improvement relative to the control, the results were further improved for samples containing Series 1 incorporating 3 wt % CI-1.

Example 2

Silicone Ester-Based Corrosion Inhibitors in an Epoxy-Based Self-Healing System

The same corrosion inhibitor (CI-1) was evaluated as part of an epoxy-based self-healing system (Series 2). The samples were prepared as discussed above, except that in this case an epoxy clear coating (DER 675-X75/DEH 58) was used. Two versions of microcapsules were prepared with average sizes ranging from 10-15 microns. The first version did not include any corrosion inhibitor, while the second version included 5 wt % CI-1. Three sets of samples were prepared by applying the appropriate formulation to lightly abraded CRS panels to achieve a DFT of 250 microns.

For the first set of samples, the standard coating excluding any capsules was applied to the substrate. For the second set of panels, Series 2 microcapsules were incorporated into the coating formulation at 5 wt % but did not include any corrosion inhibitor. The final set of panels incorporated Series 2 microcapsules at 5 wt % and in turn containing 5 wt % CI-1.

Figure 4:
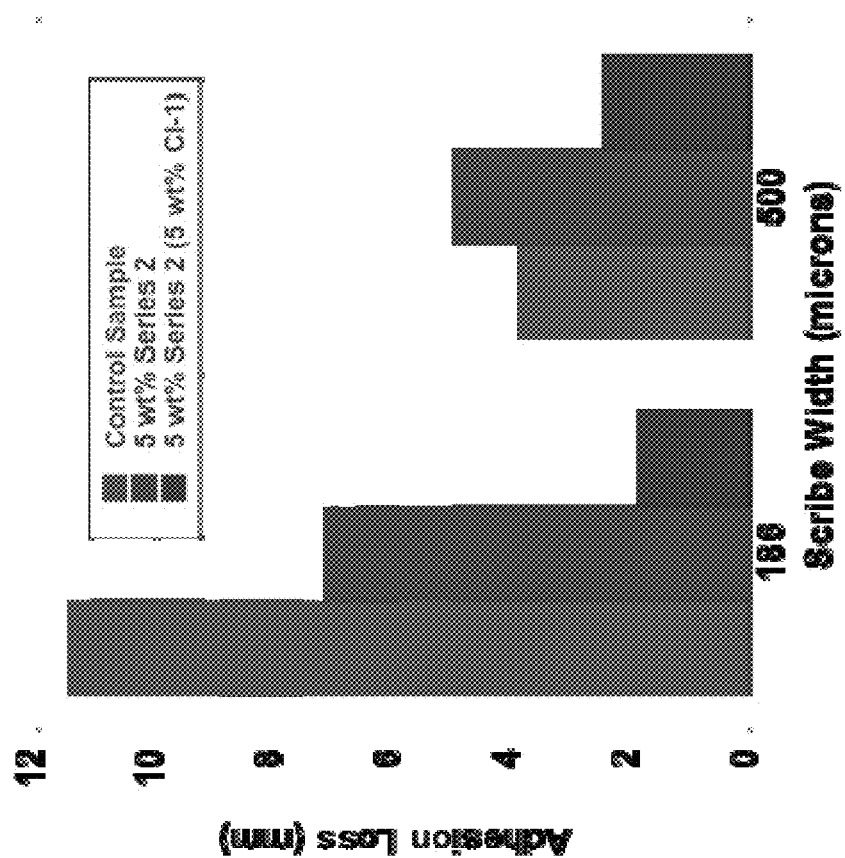
FIG. 4 is a graph showing a summary of corrosion resistance of various epoxy formulations applied on cold-rolled steel and exposed to ASTM B117 conditions for 1,000 hours, in accordance with various embodiments.
Figures 5A, 5B, 5C:
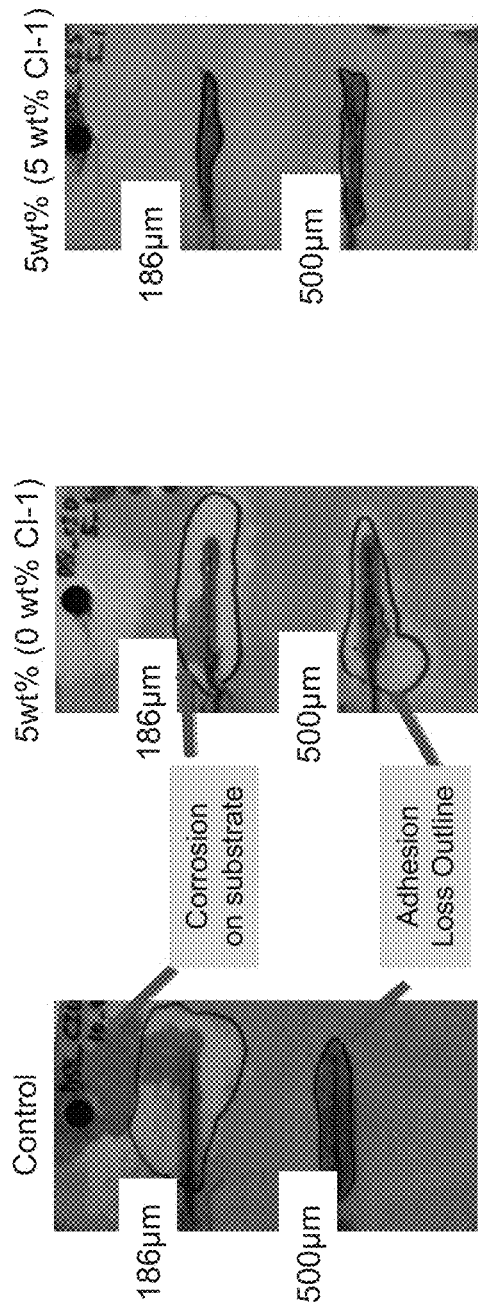
FIGS. 5A, 5B, and 5C show digital images of various epoxy formulations applied on cold-rolled steel substrates after exposure to ASTM B117 conditions for 1,000 hours, including corrosion creep from scribe and area of loss of adhesion, which are depicted for a control sample (standard epoxy clear coating.

FIG. 4 shows a summary of corrosion resistance of various epoxy formulations applied on cold-rolled steel and exposed to ASTM B117 conditions for 1,000 hours, and FIGS. 5A, 5B, and 5C show digital images of various epoxy formulations applied on cold-rolled steel substrates after exposure to ASTM B117 conditions for 1,000 hours, including corrosion creep from scribe and area of loss of adhesion, which are depicted for a control sample (standard epoxy clear coating; FIG. 5A), an epoxy coating containing 5 wt % Series 2 microcapsules (FIG. 5B), and an epoxy coating containing 5 wt % Series 2 microcapsules, which in turn contain 5 wt % CI-1 (FIG. 5C), all in accordance with various embodiments.

The results demonstrate that corrosion resistance is much improved with samples containing corrosion inhibitor when microcapsule payloads decrease with lower average sizes [10-15 microns for Series 2 compared to 30-40 microns for Series 1]. In general, in coatings with lower DFTs, which require capsules with lower average diameters, the incorporation of a corrosion inhibitor is extremely useful for improved corrosion resistance due to self-healing.

Example 3

Silicone Ester-Based Corrosion Inhibitors in a Silicone Epoxy Functionalized Alkyd-Based Self-Healing System The relationship between damage size and the effect of the incorporation of a corrosion inhibitor as part of a microencapsulated healing agent formulation is very clearly exhibited by the evaluation of a silicone epoxy functionalized alkyd-based self-healing system (Series 3). A comparison of three sets of coated CRS panels was performed. For the first set, the panels were coated with a commercial epoxy marine primer. For the second set, the CRS panels were coated with the same primer but in this case, Series 3 microcapsules (excluding any corrosion inhibitor) were added to the formulation at 5 wt %. For the final set, the CRS panels were coated with the same primer, but in this case, Series 3 microcapsules containing 5 wt % CI-1, were added to the formulation at 5 wt %. The panels were all coated to a DFT of 150 microns. In cases in which microcapsules were used, the average size of the capsules used was 15 microns. The samples were scribed using 186 micron, 500 micron, and 1 mm scribe tools. After scribing, the samples were exposed to ASTM B117 conditions for 500 hours, after which the corrosion creep from scribe was measured in mm.

Figure 6B:
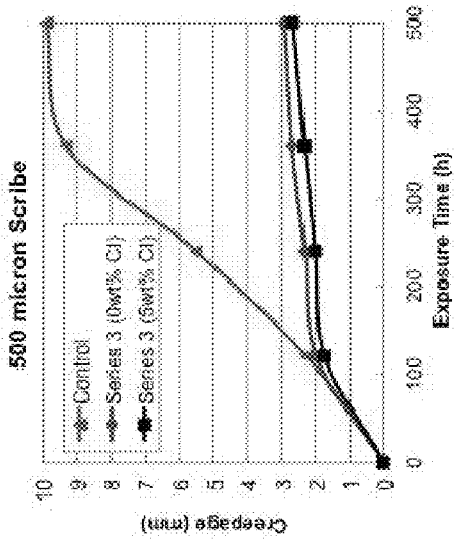
FIGS. 6A, 6B, and 6C are three graphs showing a summary of corrosion resistance performance of various epoxy formulations applied on cold-rolled steel and exposed to ASTM B117 conditions as a function of time, including corrosion creep from a 186-micron scribe (FIG. 6A), corrosion creep from a 500-micron scribe (FIG. 6B), and corrosion creep from a 1 mm scribe (FIG. 6C), in accordance with various embodiments.
Figure 6A:
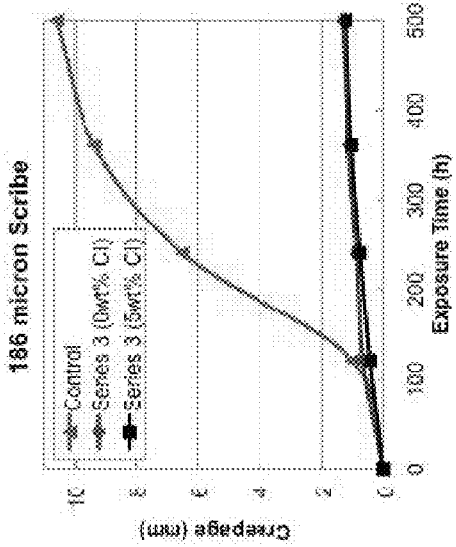
Figure 6C:
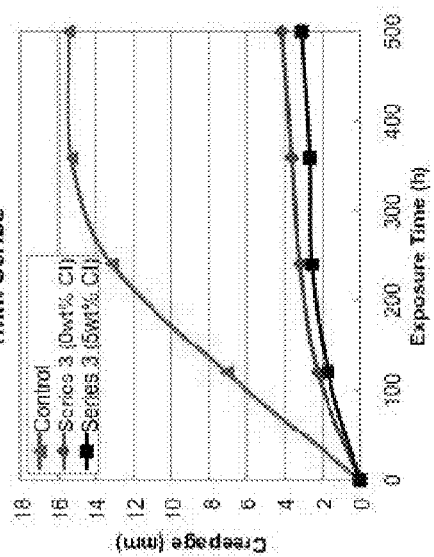
Figure 7:
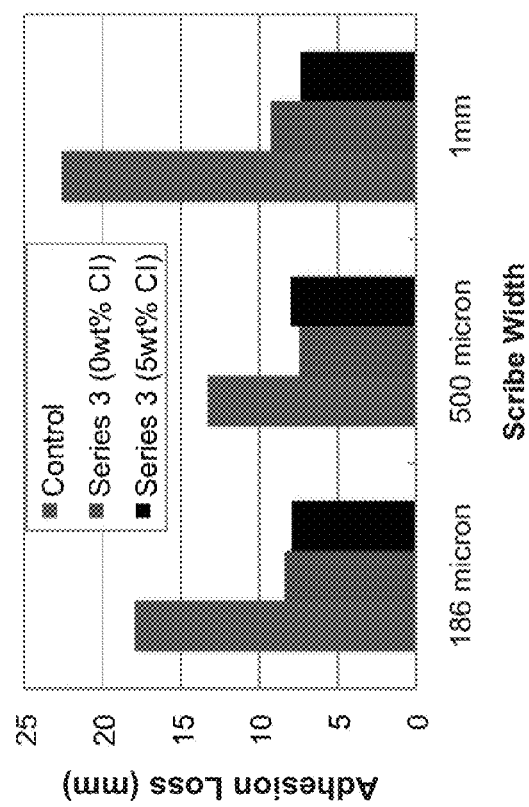
FIG. 7 is a graph showing a summary of adhesion loss performance of various epoxy formulations after exposure to ASTM B117 conditions for a total of 500 hours, in accordance with various embodiments.
Figures 8A, 8B, 8C:
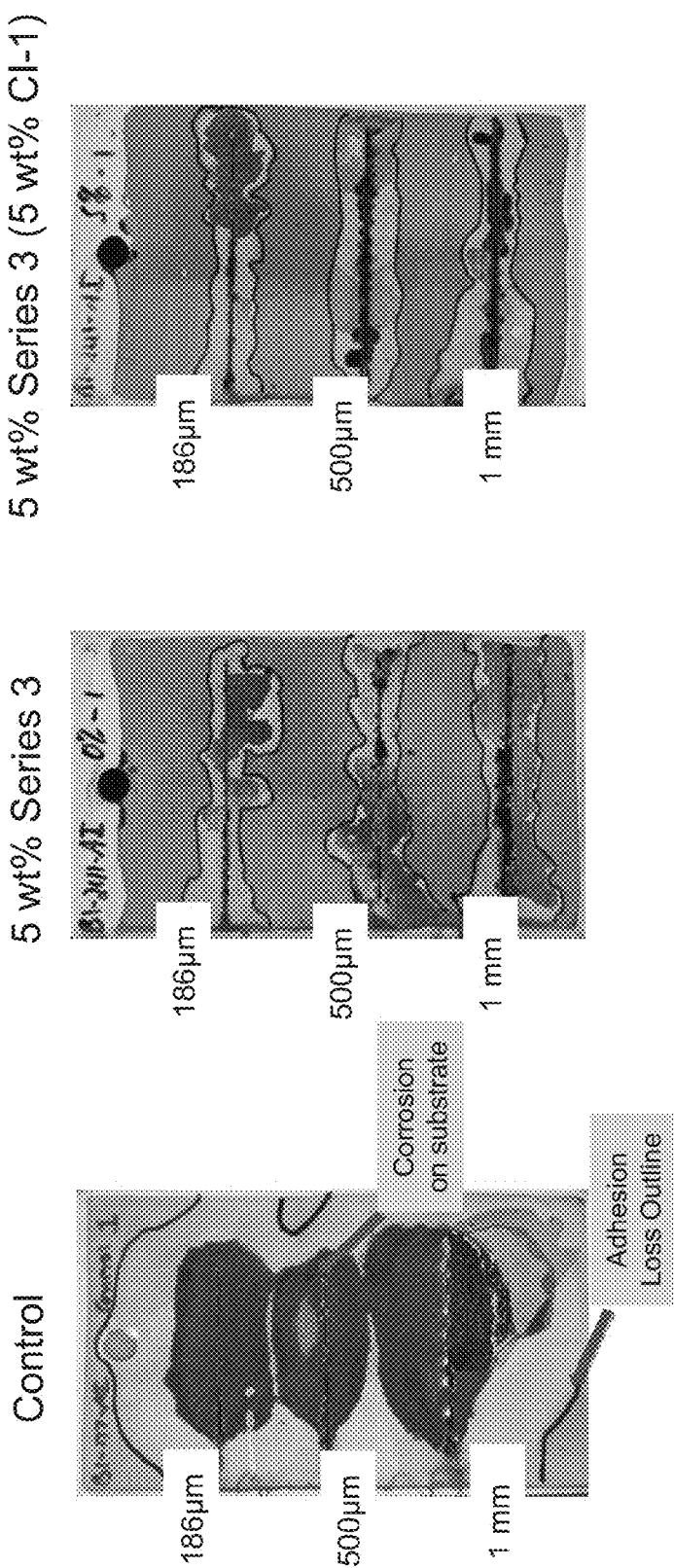
FIGS. 8A, 8B, and 8C are three digital images of various epoxy formulations applied on cold-rolled steel substrates after exposure to ASTM B117 conditions for 500 hours, and corrosion creep from scribe and area of loss of adhesion are shown for a control sample (standard epoxy marine coating.

FIGS. 6A, 6B, and 6C show a summary of corrosion resistance performance of various epoxy formulations applied on cold-rolled steel and exposed to ASTM B117 conditions as a function of time, including corrosion creep from a 186-micron scribe (FIG. 6A), corrosion creep from a 500-micron scribe (FIG. 6B), and corrosion creep from a 1 mm scribe (FIG. 6C). FIG. 7 shows a summary of adhesion loss performance of various epoxy formulations after exposure to ASTM B117 conditions for a total of 500 hours, and FIGS. 8A, 8B, and 8C are three digital images of various epoxy formulations applied on cold-rolled steel substrates after exposure to ASTM B117 conditions for 500 hours. Specifically, corrosion creep from scribe and area of loss of adhesion are shown for a control sample (standard epoxy marine coating; FIG. 8A), an epoxy coating containing 5 wt % Series 3 microcapsules (FIG. 8B), and an epoxy coating containing 5 wt % Series 3 microcapsules, which in turn contain 5 wt % CI-1 (FIG. 8C), all in accordance with various embodiments.

Regardless of the scribe or damage size, the control samples which did not include any microcapsules exhibited significant corrosion creep from scribe ranging from just over 10 mm for the 186 micron scribe to almost 16 mm for the 1 mm scribe. In contrast, samples containing Series 3 exhibited significant minimization of corrosion creep. In general, samples coated with formulations that included Series 3 containing 5 wt % CI-1 exhibited the best performance, and the ability of these samples to resist corrosion improved, relative to the control or samples containing Series 3 without any corrosion inhibitor, with increasing damage size.

Example 4

Figure 9:
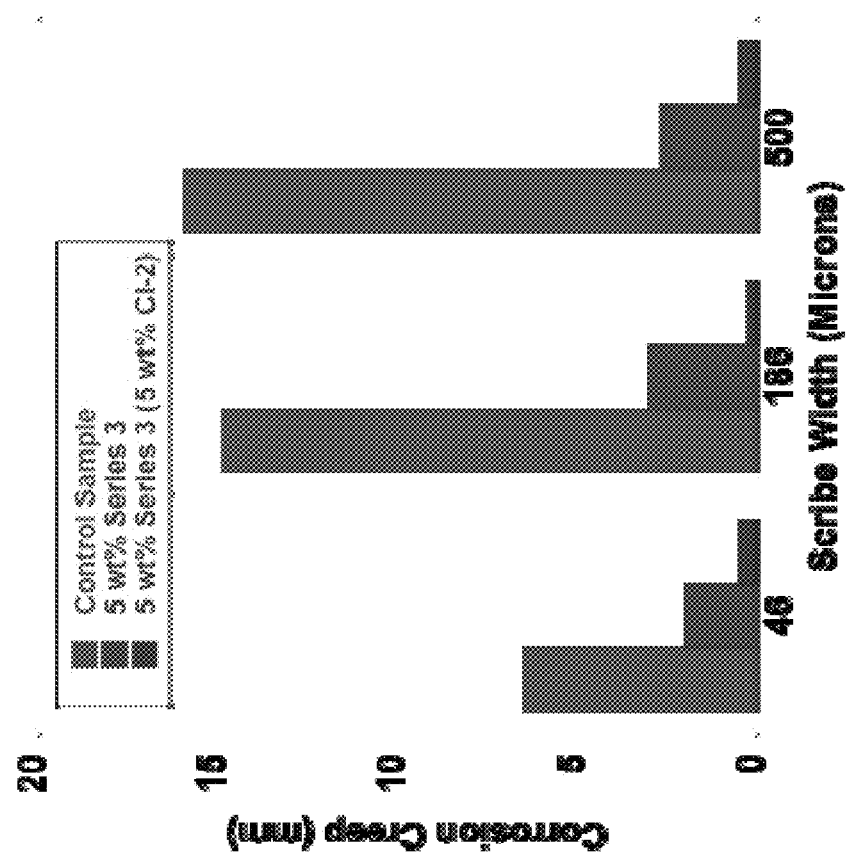
FIG. 9 is a graph showing a summary of corrosion resistance of various polyurethane formulations applied on cold-rolled steel and exposed to ASTM B117 conditions for 240 hours, in accordance with various embodiments.

Alkylammonium Benzothiazolylhiosuccinate-Based Inhibitors in a Silicone Epoxy Functionalized Alkyd-Based Self-Healing System Alkylammonium benzothiazolylhiosuccinate-based inhibitors (CI-2) that meet the set of criteria identified above for incorporation into a self-healing system were also found to improve the corrosion resistance of self-healing coatings. FIG. 9 is a graph showing a summary of corrosion resistance of various polyurethane formulations applied on cold-rolled steel and exposed to ASTM B117 conditions for 240 hours, and FIGS. 10A, 10B and 10C are digital images of various polyurethane formulations applied on cold-rolled steel substrates after exposure to ASTM B117 conditions for 240 hours, in which the area of substrate corrosion creep is labeled for a control sample (standard polyurethane coating; FIG. 10A), a polyurethane coating containing 5 wt % Series 3 microcapsules (FIG. 10B), and a polyurethane coating containing 5 wt % Series 3 microcapsules, which in turn contain 5 wt % Corrosion Inhibitor 2 (CI-2; FIG. 10C), in accordance with various embodiments.

As was the case above for CI-1, samples containing 5 wt % Series 3 microcapsules exhibited significantly less corrosion creep from scribe relative to the control sample, which did not include any self-healing additive (e.g., compare FIGS. 10A and 10B). However, samples incorporating 5 wt % Series 3 and containing 5 wt % CI-2 exhibited less corrosion creep from scribe relative to those incorporating Series 3 without any corrosion inhibitor or the control sample (FIG. 10C).

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A self-healing system comprising:
a plurality of microcapsules, wherein each of the plurality of microcapsules encapsulates:
- a self-healing material; and
- a first corrosion inhibitor, wherein the first corrosion inhibitor is a trialkoxysilane, is a liquid, is insoluble in water, and forms a single hydrophobic phase when mixed with the self-healing material.

2. The self-healing system of claim 1, wherein the self-healing material comprises polydimethylsiloxane (PDMS), an epoxy, or a silicone epoxy functionalized alkyd.

3. The self-healing system of claim 1, wherein the first corrosion inhibitor is miscible with the self-healing material.

4. The self-healing system of claim 3, wherein the first corrosion inhibitor has a pH of between 4 and 8.

5. The self-healing system of claim 3, wherein the first corrosion inhibitor promotes adhesion to a metal substrate.

6. The self-healing system of claim 5, wherein the metal substrate comprises iron, aluminum, or steel.

7. The self-healing system of claim 3, wherein the first corrosion inhibitor:
- is a liquid;
- is insoluble in water;
- forms a single hydrophobic phase when mixed with the self-healing material;
- has a pH of between 4 and 8; and
- promotes adhesion to a metal substrate.

8. The self-healing system of claim 1, wherein the first corrosion inhibitor has the formula:

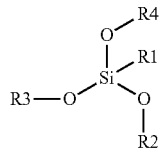

wherein R1, R2, R3, and R4 are each independently methyl, ethyl, propyl, or butyl.

9. The self-healing system of claim 1, wherein the self-healing system further comprises a second corrosion inhibitor, wherein the second corrosion inhibitor comprises a benzothiazolylthio succinic acid-based corrosion inhibitor.

10. The self-healing system of claim 1, wherein the system comprises from 0.1% to 10% corrosion inhibitor by weight.

11. A method of creating a self-healing system, comprising:
providing a self-healing material;
providing a corrosion inhibitor;
mixing the self-healing material and the corrosion inhibitor in a desired ratio to form a mixture; and
microencapsulating the mixture, thereby creating the self-healing system;
wherein the corrosion inhibitor is a trialkoxysilane, is a liquid, is insoluble in water, and forms a single hydrophobic phase when mixed with the self-healing material.

12. The method of claim 11, further comprising adding the self-healing system to a matrix.

13. The method of claim 12, wherein the matrix is a coating, a sealant, adhesive, or reinforced polymer composite.

14. The method of claim 11, wherein providing a self-healing material comprises providing a polydimethylsiloxane (PDMS), an epoxy, or a silicone epoxy functionalized alkyd.

* * * * *